United States Patent Office 3,726,697
Patented Apr. 10, 1973

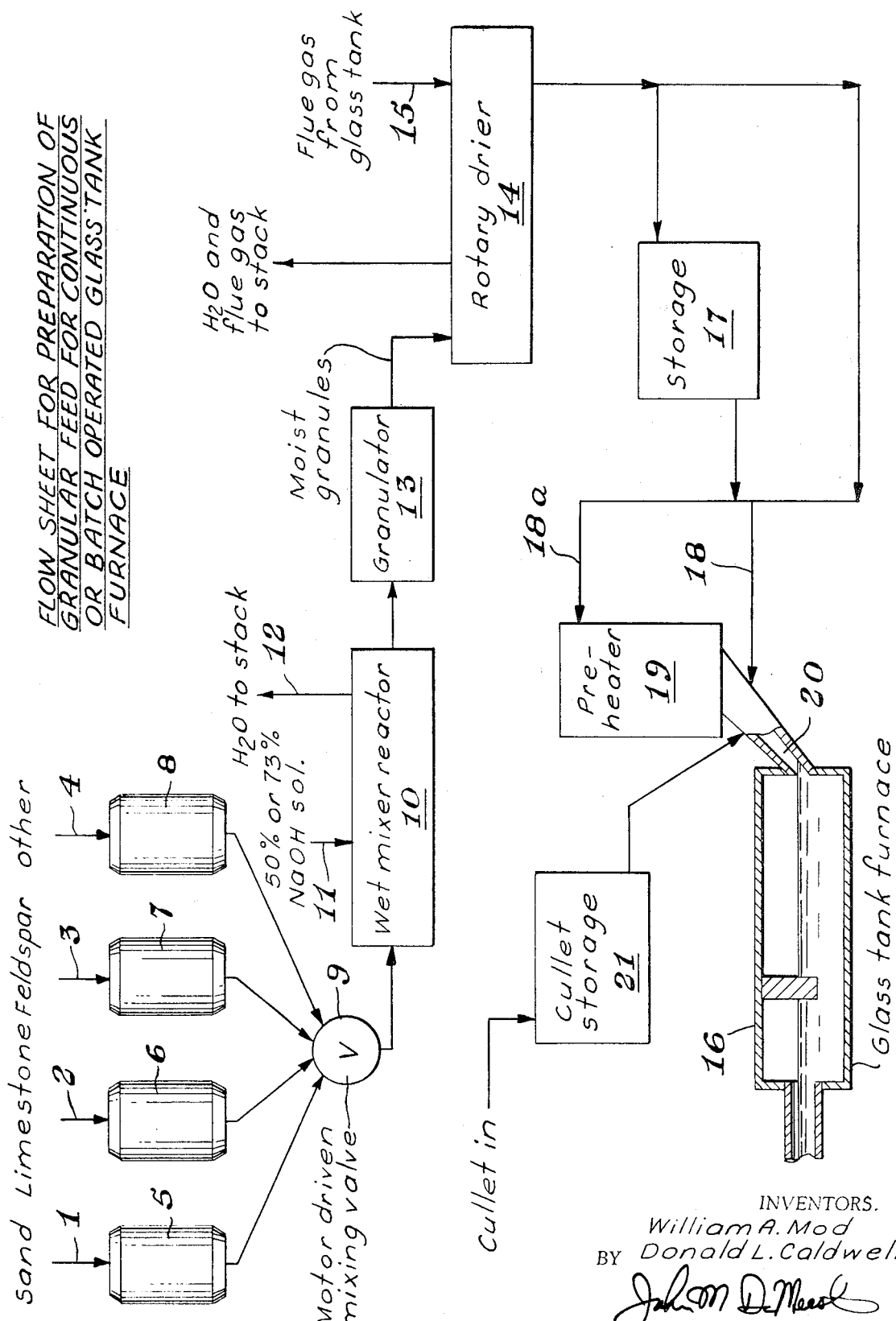

3,726,697
GLASS MANUFACTURE FROM PREREACTED
BATCH AND COMPOSITION
William A. Mod and Donald L. Caldwell, Lake Jackson, Tex., assignors to The Dow Chemical Company, Midland, Mich.
Continuation-in-part of applications Ser. No. 558,055, June 16, 1966, and Ser. No. 597,665, Nov. 29, 1966. This application Aug. 17, 1967, Ser. No. 662,272
Int. Cl. C03c 3/04
U.S. Cl. 106—52          7 Claims

ABSTRACT OF THE DISCLOSURE

This specification discloses a non-decreptitating, dry, glass-making batch composition which is infinitely storable, and a method for preparation thereof, the composition being useful in preparing a final glass product having from about 4 to 20 weight percent of alkali metal flux oxides therein. The batch is characterized in that at least 50 weight percent of said alkali metal flux oxide concentration in the final glass product is derived from an alkali metal hydroxide as a component in the batch and further characterized in that the batch is in a substantially reacted discrete form prior to melting. A significantly reduced melting and fining time and a reduced seed count per unit time is obtained, among other advantages, from said glass making batch.

---

The present application is a continuation-in-part of prior application Ser. No. 597,665, filed Nov. 29, 1966, now abandoned, and prior application Ser. No. 558,055, filed June 16, 1966, now abandoned.

The term "alkaline earth metal oxide source" as used herein refers to alkaline earth metal compounds which will furnish alkaline earth metal oxide values in the final glass product and includes sources such as limestone, dolomite, calcined limestone, calcined dolomite, $CaCO_3$ and $Ca(OH)_2$.

The term "seed count" as used herein refers to a count made of tiny bubbles or voids per unit designation appearing in the final glass product as measured under a standard set of conditions as hereinafter described in conjunction with the examples.

The term "non-friable" as used herein means no substantial amount of disintegration of the granules or particles of the present invention during normal handling, transferring or storing.

The term "final glass product" as used herein refers to a final glass product composition ordinarily used, for example, for windows and bottles having a silica content generally between about 60 and 85 percent, preferably between 68 and 75 percent, and alkali flux ($Na_2O$ and $K_2O$) oxide values between 4 and 20 percent, including the so-called "soda-lime glasses" having between 10 and 20 percent alkali flux as well as the chemical and heat resistant borosilicate glasses ranging in silica plus boric oxide from about 85 to 93 percent and in alkali fluxes from about 4 to about 10 percent, the common stabilizing oxides alumina, calcia, magnesia, and lead oxide, including any fining agents and/or decolorizing agents essentially making up the remaining constituents.

In conventional soda-lime glass making practice, a number of finely sized raw materials which make up the glassmaking batch are weighed, mixed, and transported to the glass melting furnace. The composition of a "batch" in addition to the glass-forming materials, typically contains by weight from about 15 to about 35 percent of an alkali metal carbonate, such as sodium carbonate (soda ash), as a primary source of alkali metal flux oxides in the resulting glass product and sometimes as low as 10 and as high as about 40 percent alkali metal carbonate. The batch also contains alkaline earth metal carbonates typically, calcium carbonate, as CaO-source materials and other stabilizers, in an amount to provide from about 8 to about 14 percent of CaO in the final glass product and preferably 9.5 to 11.5 percent CaO in said product. The balance of the batch is a glass forming material such as silica, and small amounts of other agents designed to impart a particular affect.

To decrease dusting, water has been used in an amount usually less than about 20 percent by weight, or a solution of water and caustic soda, each ordinarily less than about 5 percent by weight, is sometimes added to the batch during mixing prior to transporting to the glass melting furnace. During such transporting, and general handling of this conventional batch, without such water addition, segregation of materials by particle size and density ordinarily occurs to some extent. This contributes to longer fining and homogenizing times. Seed count, which reflects progress of fining, is controlled by changing pull rate, melt temperature, etc., until within specification.

A primary object of the present invention is to provide for introduction into a glass tank furnace of a novel feed material in a discrete form which (a) is dry, hard and non-friable thus avoiding the heretofore mentioned dusting problems, (b) is characterized by being substantially reacted with respect to at least some of the batch components, (c) facilitates ease in the general handling and storage of the batched feed, (d) is very homogeneous and intimately mixed to allow increased reaction rates during melting of the batch, (e) significantly reduces the melting-refining time of the resulting glass, compared with glass produced by conventional practice, (f) enables glass tank furnaces to be operated (pulled) at higher rates, and (g) which is essentially completely non-decrepitating. This latter characteristic is one not obtained in conventional glass batches and is a very important feature in glass production as will be explained more fully, hereinafter.

An object of the present invention is to provide a hard, free flowing, substantially homogeneous, storable batch feed as discrete masses for use in a glass melting tank, the feed being characterized in form and content such as to provide a homogeneous final glass product having an acceptable seed count within a significantly shorter time compared with conventional practice.

The figure of the appended drawing is a schematic flow diagram of one embodiment of the method of the present invention.

The above and other objects and advantages have been obtained in accordance with the present invention by admixing one or more alkali metal hydroxides with an amount of one or more glass formers such as, e.g., silica sand to provide a final glass product, and an amount of an alkaline earth metal oxide source, such as, for example, calcium carbonate, the balance being various stabilizing oxides, fining agents and/or decolorizing agents, the amount of alkali metal hydroxide employed being sufficient to provide at least 50 percent, preferably 60 to about 100 percent, and more preferably from 75 to 100 percent, of the alkali flux oxide content of the final glass product (except for that which is supplied by the feldspar or other minor $Na_2O$ and $K_2O$ sources (and substantially reacting said alkali metal hydroxide with at least a major portion of the alkaline earth metal oxide source content therein at a temperature of less than about 160° C. to form a moist reaction mixture containing, e.g., among other reaction products, alkaline earth metal hydroxide, alkali metal carbonate (where alkaline earth metal carbonate is used) and as little unreacted alkali metal hydroxide as possible. The reaction mixture is then provided in a discrete form by, e.g., granulation into a convenient particle size, whereupon it may be dried by, e.g., flue gases (or by any other drying means). The moist, reacted, batch may as well be dried as such without first granulating, then crushed or attritioned into discrete masses. In any event, the resulting batch consists of hard, essentially homogeneous, dry, flowing, substantially nonfriable, discrete masses of a predetermined size which can then, e.g., be transported hot to the glass furnace or be stored indefinitely without any segregation of ingredients. These granules or agglomerates or discrete masses, regardless of how formed, being non-friable and hard, provide a very desirable glass tank feed and in addition, upon melting, provide an extremely low seed count in a final glass in a significantly shorter time than in the case of conventional practice. Moreover, the discrete particles overcome a very real and serious problem in the glass-making art in that they eliminate decrepitation of the glass batch.

Heretofore, the limestones used in glass batches exploded or popped when subjected to elevated temperatures employed to melt the batches to molten glass. This explosion or decrepitation causes materials to leave the surface of the batch and to be picked up by and carried into the gas and flame streams which are normally played over the melting batch to fuse it into glass. Accordingly, the amount of the batch is reduced or a deficiency may result in the batch proportion. The primary disadvantage of this decrepitation, however, in the case where regenerative furnaces are used, is that this carry over of batch "falls out" or deposits in the regenerators causing accumulation of solids therein and eventual plugging of these units, thus the necessity of cleaning.

The present invention eliminates this decrepitation and its attendant difficulties, thereby utilizing all materials in the glass batch as well as eliminating any possibility of altering the batch proportions. Moreover, no clogging of the furnace regenerators by "carry over" is obtained; the furnace may, therefore, be operated more efficiently for longer periods of time.

While it has heretofore been known to employ small amounts of caustic soda in glass batches to control dusting and segregation in batches it has not heretofore been known or practiced, nor has it been obvious to replace more than about 50 percent and preferably 100 percent of the alkali metal carbonates (soda ash) with caustic soda to provide a substantially, if not fully, reacted glass making composition, especially in a discrete form as pellets or agglomerates. The present invention, while providing the handling, blending, and processing advantages and improvements hereinbefore specified, also produces a dramatic result, as aforesaid, in that an acceptable seed count in the glass is obtained in a significantly shorter melting-fining time compared with conventional practice employing soda ash as the primary alkali flux oxide source material, and with essentially no decrepitation of the glass batch during said melting.

In carrying out the present invention, the dry raw materials are weighed and mixed by either manually controlled or by an automatically controlled mixing means. The weighed dry materials are then preferably mixed with the desired amount of aqueous alkali metal hydroxide solution as hereinbefore mentioned, and kneaded in a heated mixer, preferably, such as a pug-type mixer, to accomplish substantial reaction between, e.g., the alkaline earth metal carbonate, alkali metal hydroxide, and possibly other batch constituents. So-reacted, the moist mixture is preferably granulated in a suitable type granulator to a desired size of, e.g., from about $\frac{1}{16}$ inch to about 1 inch. The granules are dried in any suitable dryer, e.g., a rotary dryer, which may employ heat as furnished directly or indirectly from otherwise waste gases or primary fuel sources. By thus taking advantage of the reaction and drying same, including granulating and drying or by drying and attritioning the dried mass to a discrete form, the reaction mixture does not set up or plug equipment in any way. So dried, the granules are transported to storage or to the glass tank for melting. The entire process can be done in batches, or on a continuous basis such as shown in the drawing. While a granule or pellet size of about $\frac{1}{8}$ inch to $\frac{1}{4}$ inch is desirable, the pellet size may be smaller than $\frac{1}{16}$ inch, or larger than 1 inch in size as the situation may permit. It is essential, however, that the moist mixture be pelleted or granulated and dried, or, dried and attritioned, in the present invention, or particulated in some manner.

With respect to the amount of alkali metal hydroxide employed to furnish the alkali metal oxide content in the final glass under the present invention, an amount of less than 50 percent as a replacement of conventional soda ash will normally result in a detrimental increase in the amount of fines resulting from friability of the pellets produced by the granulation step of the method of the present invention, and a marked decrease in the mechanical strength of said pellets or granules. On the other hand, by furnishing 100 percent of the alkali metal oxides in the glass by means of the alkali metal hydroxide substitution (except for that which is supplied by feldspar or other minor $Na_2O$ or $K_2O$ sources), a hard, non-friable granulated glass tank feed is obtained.

The concentration of the alkali metal hydroxide solution used as a means of introducing said alkali metal hydroxide into the raw material batch should preferably be between about 45 percent and about 75 percent NaOH by weight in the case of caustic soda, and about 45 percent to 80 percent by weight of KOH in the case of caustic potash. Use of more concentrated solutions will normally result in insufficient moisture being present in the granulation step. Use of more dilute solutions is ordinarily economically unfeasible. Use of solutions more concentrated than 75 percent caustic or anhydrous flake or powdered caustic are included for use in the present invention and will usually require addition of a sufficient amount of water to facilitate reaction of the batch components and granulation of the reacted batch.

In the mixing step of the present invention, the time and temperature of mixing should be adjusted so that (1) the reaction between the alkali metal hydroxide-alkaline earth metal oxide source material occurs relatively rapidly, and substantially completely, and (2) the feed of the granulator is of the desired consistency to permit formulation of pellets of granules. Reaction times vary, e.g., from about 5 minutes to about 30 minutes because the reaction is temperature-dependent and a function of the physical characteristics of different alkaline earth metal oxide sources which may be used, as to geological formation sources, chemical composition, reactivity, and the like.

When granulating, drying of the granules is ordinarily accomplished at a temperature within the range of from about 100° C. up to about 800° C., preferably from about 200–300° C., the lower limit being established simply by the desirability of expelling all but 2 to 7 percent of the water from the granules in reasonably short time. The upper limit is set by the desirability of avoiding sintering or fusion together of said granules to maintain their flowability. Actual drying times and conditions may be predetermined consistent with the purpose as discussed above.

If not granulated, the warm (non-frozen) moist batch mass may be allowed to air dry as such, or be spread in a layer to be dried, or be heated to an elevated temperature for a period to dry same, thereafter to be comminuted or attritioned to smaller discrete masses. In any event, the batch should be removed from the mixer prior to drying, lest the reacted batch "set-up" therein.

By means of the present invention, substantially a 100 percent yield of hard, dustless homogeneous, substantially dry discrete reacted masses containing, for example, in the case of soda-lime glass, primarily silica, feldspar, alkali metal carbonate, alkaline earth metal hydroxides, (with as little unreacted alkali metal hydroxide as possible) and other minor constituents, is obtained as a substantially reacted glass tank feed which when melted at conventional glass melting temperature gives a commercially acceptable molten glass melt unexpectedly characterized by reaching a low seed count more rapidly as compared to molten glass melts prepared from conventional raw material batches using conventional alkali metal carbonates as the primary source of (i.e., over 50 percent) of alkali metal oxides. The present novel invention is not to be confused with substantially unreacted prior art glass making batch compositions employing caustic soda (NaOH) as a mere addition to a conventional glass batch, or with batches containing caustic as dust control agents. The term "substantially reacted" as used herein means substantial reaction between the components in the caustic substituted batch in accordance with the present invention is indicated by, and essential to the extent of having, a capability of setting-up and being granulated and of providing a dried material of high compressive strength, as compared, to the very low compressive strength of a conventional glass making batch containing soda ash as the source of alkali metal flux oxides in a final glass product. Moreover, if a batch containing alkali metal hydroxide in accordance with the invention is kept at an elevated temperature sufficient to prevent physical freezing, an exotherm will occur which is indicative of reaction. Heating of the batch as it is granulated or mixed together with further heating during drying assures a substantially complete reaction.

The figure concerns a schematic flow diagram of an embodiment of the method of the present invention employing, for example, a glass raw material batch composition comprising a mixture of silica, limestone, feldspar, sodium hydroxide, and minor ingredients in such proportions as to give a final glass analysis similar to that recited in Example 1 below.

Referring to the drawing, glass grade sand 1, limestone (CaCO$_3$) 2, feldspar (a sodium-postassium aluminosilicate mineral) 3, and minor quantities of other materials 4, such as fining agents, colorants, and decolorants, each stored in suitable hoppers or tanks are weighed by Massometers 5, 6, 7, and 8, and are discharged therefrom through a motor driven mixing valve 9 into a wet mixing chamber 10 wherein an aqueous caustic soda solution 11 is introduced and mixed with the other ingredients in an amount to provide at least about 50 percent of the total requirement of alkali metal oxides in the final glass product. Other suitable devices may be used in place of the Massometers and mixing valve. Residence time in the mixer-reactor depends on the concentration and temperature of the alkali metal hydroxide solution, the limestone and sand characteristics and temperature, and the heat applied to the mixer-reactor. For example, if a 73 percent sodium hydroxide solution is used, a mixing time of from 15–20 minutes is employed, whereas, with a 50 percent solution, 25 to 30 minutes is employed. The temperature in the mixer is maintained at or above a temperature of 100° C. by the evaporating water 12 of the sodium hydroxide solution. In the wet mixer 10, the reaction between the sodium hydroxide and limestone takes place. The mass of reacted and unreacted material is then fed into a granulator 13 to granulate the material into sized granules. As they depart from the granulator device 13, the granules are fed into, e.g., a rotary drier 14 wherein water is expelled therefrom by heating. The drier device 14 can be heated at least in part by flue gases 15 from the glass melting tank 16 with the balance of any heat, or the entire heat requirement, being provided from other external means. So dried, the granules as they exit from the drier are relatively hard and may be cooled and stored 17, fed directly to a glass tank 18, or fed 18(a) to a rotary or shaft type preheater 19 where they may be heated to about 750° C. or to a temperature where the granules do not sinter together and then directly to the glass melting tank as a feed 20. Cullet, from a storage vessel 21, may be fed as a separate stream at this point. Either during storage or transporting to the glass tank, no difficulties are encountered as to dusting of the glass batch ingredients or loss of homogeneity (segregation) in the materials before being introduced into the glass tank. The granulated batch is substantially uniform in composition notwithstanding that the granules themselves may vary somewhat in composition.

If desired, alkali metal silicates may be employed in the composition and method of the present invention to provide a portion of the alkali metal flux values in the final glass product. For example, sodium metasilicate could be employed to provide up to about 50 percent of said flux oxides in combination with alkali metal hydroxides providing the balance of flux oxides, other than the flux oxides supplied, if any, by, e.g., feldspar. Thus a glass making batch would be obtained having the advantages hereinbefore described of reduced seed counts, shorter melting and fining time, and non-decrepitation.

The following examples serve to further illustrate the present invention, but are not to be construed as limiting the invention thereto:

For purposes of the following examples, a standard "seed count test" is employed. In general, this test comprises, first, providing an amount of the glass-forming composition to be tested sufficient to provide when melted a 50-gram batch of glass. The composition is then placed in an Englehard Standard Form No. 201 (250 cc.) platinum-rhodium crucible and exposed to a temperature of about 1450° C. for 2 hours, whereupon, the viscous molten glass mass is solidified into a patty about 57 mm. in diameter and about 11 mm. in thickness. The patty is released from the crucible, annealed, and the sides and bottom of the patty ground off. So-ground the patty is put into a dish filled with an indexing liquid of, for example, ethylene dichloride, a strong light is shown through the side of the patty, a photographic transparency is made and projected onto a screen, and the seeds (bubbles) in the magnified projection are counted. For conformity in testing, the thickness of all patties was maintained essentially constant both for the examples of the present invention and for comparative control examples.

EXAMPLE I

The following raw materials, all screened to pass through a 100-mesh screen (U.S. Standard Sieve) were weighed and then mixed and heated in a one-gallon mixer to 100° C.:

|  | Grams |
|---|---|
| Sand (essentially SiO$_2$) | 337.0 |
| Limestone | 88.2 |
| Feldspar | 42.3 |
| Na$_2$CO$_3$ | 28.5 |
| Total | 496.0 |

The sodium carbonate (soda ash) ingredient was intended to be in an amount to provide only about 25 percent of the total $Na_2O$ content in the final glass product above that furnished by the feldspar. In order to provide the other 75 percent of the $Na_2O$ content, 129.2 grams of 50 percent sodium hydroxide aqueous solution at 25° C. was added and the entire mix was stirred for 25 minutes at 70° C. to substantially react the batch. The mix was dried in three separate portions in a pint container inclined 30 degrees from the horizontal and rotating at 80 r.p.m., thereby to agglomerate and in effect randomly pelletize the mix while heat was applied externally to the container until a temperature of 220° C. was reached therein. The so-formed granules or pellets were then analyzed for size distribution by screening on a "Ro-Tap" vibrator for about 3 minutes. Sieve analysis was as follows:

| Mesh: | Percent |
| --- | --- |
| +8 | 7.9 |
| −8+20 | 73.6 |
| −20+50 | 13.6 |
| −50 | 4.8 |
| | 99.9 |

Small glass patties were prepared from these granules by melting 50-gram portions in a platinum-rhodium crucible at 1450° C. for 2 hours. The circular patties produced were approximately 11 mm. in thickness and 57 mm. in diameter, having an analysis as follows:

| | Percent |
| --- | --- |
| $SiO_2$ | 74.1 |
| $Na_2O$ | 14.7 |
| $CaO$ | 9.4 |
| $Al_2O_3$ | 1.8 |
| | 100.0 |

Seed count was determined by placing the patties in ethylene dichloride indexing fluid and the seeds or gas bubbles in the glass counted. A set of six patties made from these granules had an average seed count of 32 seeds per cubic centimeter.

COMPARATIVE EXAMPLE (Illustrative of conventional procedure)

For comparative purposes, a set of seven patties was made using non-pelletized, −70+100 mesh (U.S. Standard Sieve) raw materials as an essentially non-reacted batch containing soda ash as the only source of $Na_2O$ in the final glass product, except for that provided by the feldspar. The following weights were used:

| | Grams |
| --- | --- |
| Sand | 33.70 |
| Limestone | 8.82 |
| Feldspar | 4.23 |
| $Na_2CO_3$ | 11.77 |
| Total | 58.52 |

When melted in a platinum-rhodium crucible at 1450° C. for 2 hours similarly as in Example 1 above, these materials in the indicated quantity gave a 50-gram glass patty of the size and analysis essentially as in Example 1. The average seed count of these patties was 173 seeds per cubic centimeter.

When comparing this with the seed count obtained in Example 1, i.e., 32 seeds per cubic centimeter, it can be seen that glass made in accordance with the present invention is vastly superior in quality.

EXAMPLE 2

The following raw materials, all screened to pass through a 100-mesh screen (U.S. Standard Sieve) were weighed and then mixed and heated in a one-gallon mixer to about 153° C.

| | Grams |
| --- | --- |
| Sand | 296.0 |
| Limestone | 77.5 |
| Feldspar | 37.3 |
| Total | 410.8 |

To this was added 156.4 grams of 50 percent 140° C. NaOH to provide essentially 100 percent of the $Na_2O$ content in the final glass product except for that which is supplied by feldspar. Then the mixture was substantially reacted by stirring for 20 minutes at 128° C. The mix was pelletized and dried in three separate portions as in Example 1 above, except that the container was heated to a temperature of about 210° C. The dried granules so formed of reacted batch were then separated in a vibrator with the sieve analysis as follows:

| Mesh: | Percent |
| --- | --- |
| +8 (U.S.S.) | 16.8 |
| −8+20 | 61.6 |
| −20+50 | 17.0 |
| −50 | 4.6 |
| Total | 100.0 |

Six glass patties were made of this mixture similarly as in Example 1 above, having an analysis as follows:

| | Percent |
| --- | --- |
| $SiO_2$ | 74.1 |
| $Na_2O$ | 14.7 |
| $CaO$ | 9.4 |
| $Al_2O_3$ | 1.8 |
| Total | 100.0 |

The average seed count of patties in Example 2 was 62 seeds per cubic centimeter. This result is directly comparable with the seed count of 173 seeds/cc. obtained from the comparative example above.

EXAMPLE 3

Table I shows three typical reacted batches of granular glass raw material prepared according to this invention. After preparation, each batch was treated identically, as follows: 500 grams of granules were separated by shaking in a nest of sieves on a "Ro-Tap" vibrator for three minutes. The various fractions were then recombined and placed in a sieve pan, which was shaken on the "Ro-Tap" for one hour. Final separation was then achieved by shaking a nest of sieves on the "Ro-Tap" for three minutes. The percent friability, as defined in ASTM Test D–411–45 (1961), was then calculated from the screen analysis obtained before and after shaking for one hour.

EXAMPLE 4

Table II shows two batches of granulated glass raw materials prepared and reacted in accordance with the present invention. After preparation, each batch was treated identically substantially as set forth in Example 4, except the sieve analysis before and after shaking for one hour was not recorded other than the amount of fines in order to determine percent friability.

It can be seen from Examples 4 and 5 that the percent friability of the granules of the present invention is extremely small and negligible or non-existent, illustrating the adaptability of the granules for dustless extensive handling with little or no damage to said granules, as well as indicating that the reaction of the batch components, heretofore discussed, was essentially complete thereby to provide high compressive strength granules.

TABLE I

| Run No. | Na₂O, percent from Na₂CO₃ | Na₂O, percent from NaOH | Concentration of NaOH solvent, percent | Mixing temperature, °C. | Mixing time minutes | Drying temperature, °C. | Drying time minutes | Before or after shake | Percent particle distribution (mesh, U.S. standard seive) | | | | | | | | Percent friability |
|---|---|---|---|---|---|---|---|---|---|---|---|---|---|---|---|---|---|
| | | | | | | | | | +8 | -8 +14 | -14 +20 | -20 +50 | -50 +70 | -70 +100 | -100 +140 | -140 | |
| 1 | 50 | 50 | 50 | 80 | 51 | 250 | 5 | Before | 12.2 | 9.3 | 26.1 | 30.0 | 10.3 | 12.1 | 0.0 | 0.0 | 19.8 |
| | | | | | | | | After | 7.6 | 6.9 | 24.5 | 28.9 | 7.6 | 18.2 | 6.4 | 0.0 | |
| 2 | 25 | 75 | 50 | 80 | 42 | 250 | 5 | Before | 13.0 | 22.1 | 28.8 | 33.2 | 2.5 | 0.4 | 0.0 | 0.0 | 4.4 |
| | | | | | | | | After | 12.1 | 20.6 | 28.1 | 33.8 | 2.3 | 1.7 | 1.4 | 0.0 | |
| 3 | 0 | 100 | 50 | 120 | 21 | 250 | 5 | Before | 10.7 | 47.5 | 25.5 | 12.8 | 2.8 | 0.7 | 0.0 | 0.0 | 3.2 |
| | | | | | | | | After | 8.8 | 48.3 | 25.3 | 13.0 | 2.5 | 1.2 | 0.9 | 0.0 | |

TABLE II

| Run No. | Na₂O, percent from Na₂CO₃ | Na₂O, percent from NaOH | Concentration of NaOH solvent, percent | Mixing temperature, °C. | Mixing time minutes | Drying temperature, °C. | Drying time minutes | Before or after shake | Percent particle distribution (mesh, U.S. standard seive) | | | | | | | | Percent friability |
|---|---|---|---|---|---|---|---|---|---|---|---|---|---|---|---|---|---|
| | | | | | | | | | +8 | -8 +14 | -14 +20 | -20 +50 | -50 +70 | -70 +100 | -100 +140 | -140 | |
| 4 | 0 | 100 | 50 | 95 | 21 | 220 | 8 | | | | | | | | | | 0.0 |
| 5 | 0 | 100 | 50 | 110 | 65 | 220 | 5 | | | | | | | | | | 0.5 |

EXAMPLE 5

Table No. III shows the comparison of the degree of decrepitation between limestone and a reacted glass batch prepared with the limestone in accordance with this invention. The following raw materials, all screened through a 100 mesh screen (U.S. Standard Sieve) were weighed, mixed and heated in a 1-gallon mixer to 160° C.

| | Grams |
|---|---|
| Sand | 338.8 |
| Limestone | 84.4 |
| Feldspar | 46.2 |
| | 469.4 |

To this was added 170.8 gms. of regular 50% caustic soda solution preheated to 140° C. to provide all Na₂O content of the final glass product except that supplied by the feldspar. The batch was mixed for 28 minutes at 100–110° C. granulated, and dried at 200° C. Hard granules were produced. Sample of the −4 +8 mesh was placed in a furnace at 600° C. for 10 minutes, cooled, weighed, and screened. The amount of material passing through the 8-mesh sieve was used as a measure of decrepitation. Limestone, −14 +20 mesh, was placed in a furnace at 600° C. for 10 minutes, cooled, weighed, and screened. The amount of material passing through the 20-mesh sieve was used as a measure of decrepitation. Since the reacted batch contains at least 80% sand and feldspar, it is obvious that the reacted batch gave lower decrepitation than the limestone.

EXAMPLE 6

Table IV shows the comparison of the degree of decrepitation between dolomite and a glass batch prepared with the dolomite in accordance with this invention. The following raw materials, all screened through a 100-mesh screen (U.S. Standard Sieve) were weighed, mixed, and heated in a 1-gallon mixer to 160° C.

| | Grams |
|---|---|
| Sand | 333.1 |
| Limestone | 63.2 |
| Dolomite | 57.5 |
| Feldspar | 38.7 |
| | 492.5 |

To this was added 158.1 grams of regular 50% caustic soda solution preheated to 120° C. to provide all Na₂O content of the final glass product, except that supplied by the feldspar. The batch was mixed for 21 minutes at 90–100° C. and dried at >200° C. in a rotating drier into small, hard granules. Sample of the −4 +8 mesh granules were placed in a furnace at 600° C. for 10 minutes, cooled, weighed and screened. Dolomite, −14 +20 mesh, was placed in a furnace at 600° C. for 10 minutes, cooled, weighed, and screened. Decrepitation was determined as in Example 5 above.

TABLE III

| Sample | Temperature, °C. | Weight sample Before heating, grams | Weight sample After heating, grams | Weight loss, grams | Weight passing through specified mesh, grams | Decrepitation, percent |
|---|---|---|---|---|---|---|
| −4 +8 mesh reacted mix | 600 | 5.03 | 4.62 | 0.41 | 0.14 | 3.0 |
| −14 +20 mesh limestone | 600 | 5.00 | 4.58 | 0.42 | 0.59 | 12.9 |

TABLE IV

| Sample | Temperature, °C. | Weight sample Before heating, grams | Weight sample After heating, grams | Weight loss, grams | Weight passing through specified mesh, grams | Decrepitation, percent |
|---|---|---|---|---|---|---|
| −4 +8 mesh reacted mix | 600 | 5.01 | 4.73 | 0.28 | 0.03 | 0.6 |
| −14 +20 mesh dolomite | 600 | 5.00 | 4.13 | 0.87 | 1.40 | 33.9 |

EXAMPLE 7

Ground limestone was calcined by heating at 1050–1100° C. for one hour. The following raw materials were weighed, then mixed and heated 7 minutes to 100° C. in a 1-gallon mixer.

|  | Grams |
|---|---|
| Sand | 337.80 |
| Calcined limestone | 49.20 |
| Feldspar | 48.90 |
| 50.3% caustic soda | 169.30 |
|  | 605.20 |

The mix was then granulated and dried in a ½-gallon can inclined 30 degrees from the horizontal rotating at 72 r.p.m. 30 ml. of $H_2O$ was added to the can, which was heated externally until a temperature of 140° C. was reached in the can. The granules were then placed in an oven at 200° C. and dried for one hour. The granules were then screened and the −4 +20 mesh (U.S. Standard Sieve) cut was taken for melt tests.

Small glass patties were prepared from these reacted granules by placing portions sufficient to provide 50.0 grams of glass into Englehard Standard Form No. 201 (250 cc.) platinum-rhodium crucibles and melting them at 1450° C. for measured periods of time. Essentially no decrepitation of the reacted granules was observed. Upon cooling the viscous glass mass solidified into patties about 57 mm. in diameter and about 11 mm. in thickness. The patties were released from the crucibles and annealed. Patties melted for periods of one, two and four hours were free of unmelted material and essentially homogeneous. The patties melted for two hours were subjected to the above-described standard "seed count test." The average seed count of the patties melted for two hours was 11 per cubic centimeter.

We claim:

1. A glass forming batch in the form of dried granules for preparing a glass having from about 4 to about 20 weight percent of an alkali metal oxide flux therein, which comprises: a glass former, an alkaline earth metal oxide source material, and an alkali metal oxide flux source material, wherein an alkali metal hydroxide provides at least 50 weight percent of the alkali metal oxide flux concentration; the batch being further characterized in that the alkaline earth metal oxide source material and the alkali metal hydroxide are substantially reacted together.

2. The dried, granulated glass-forming batch of claim 1 wherein the alkali metal hydroxide is present in an amount to provide from about 75 to 100 percent of the alkali metal concentration.

3. The dried, granulated glass-forming batch of claim 1 wherein the alkaline earth metal oxide source material is a calcium oxide source selected from the group consisting of calcined limestone, calcined dolomite and calcium hydroxide.

4. A method which comprises:
    (a) admixing a glass former, an alkaline earth metal oxide source material, an alkali metal hydroxide and water;
    (b) reacting the alkaline earth metal oxide source material with the alkali metal hydroxide, as evidenced by the occurrence of an exotherm, at a temperature up to about 160° C., to produce a moist, substantially reacted, glass-forming batch, the amount of alkali metal hydroxide admixed being sufficient to provide at least 50 weight percent of the alkali metal oxide concentration in the glass;
    (c) granulating the moist, substantially reacted batch; and
    (d) drying the batch granules so formed.

5. The method of claim 4 wherein the alkaline earth metal oxide source material is a calcium oxide source selected from the group consisting of calcined limestone, calcined dolomite and calcium hydroxide.

6. A method of making glass which comprises:
    (a) admixing a glass former, an alkaline earth metal oxide source material, water and an alkali metal oxide source material, wherein an alkali metal hydroxide provides at least 50 percent of the alkali metal flux oxide concentration in the glass;
    (b) heating the mixture at a temperature, up to a maximum of about 160° C., to react the alkali metal hydroxide with the alkaline earth metal oxide source material, as evidenced by the occurrence of an exotherm;
    (c) drying and particulating the reaction mixture; and
    (d) further heating the reacted mixture to produce a molten glass.

7. A method of making glass which comprises:
    (a) admixing a glass former, an alkaline earth metal oxide source material, water and an alkali metal oxide source material, wherein an alkali metal hydroxide provides at least 50 percent of the alkali metal flux oxide concentration in the glass;
    (b) heating the mixture at a temperature, up to a maximum of about 160° C., to react the alkali metal hydroxide with the alkaline earth metal oxide source material, as evidenced by the occurrence of an exotherm;
    (c) drying and particulating the reaction mixture; and
    (d) further heating the reacted mixture to produce a molten glass.

References Cited

UNITED STATES PATENTS

| | | | |
|---|---|---|---|
| 3,489,578 | 1/1970 | Pugh | 106—52 |
| 2,220,750 | 11/1940 | Bair et al. | 106—52 |
| 2,366,473 | 1/1945 | Bair | 106—52 |
| 2,869,985 | 1/1959 | Gooding et al. | 106—52 UX |
| 3,001,881 | 9/1961 | Slayter et al. | 106—52 |
| 3,451,831 | 6/1969 | Miche | 106—52 |
| 3,234,034 | 2/1966 | Jasinski et al. | 106—52 |

FOREIGN PATENTS

| | | | |
|---|---|---|---|
| 7,281 | 1837 | Great Britain | 106—52 |
| 2,284 | 1870 | Great Britain | 106—52 |

L. DEWAYNE RUTLEDGE, Primary Examiner

W. R. SATTERFIELD, Assistant Examiner

U.S. Cl. X.R.

65—27; 264—117

PO-1050
(5/69)

UNITED STATES PATENT OFFICE
CERTIFICATE OF CORRECTION

Patent No. 3,726,697          Dated April 10, 1973

Inventor(s) William A. Mod and Donald L. Caldwell

It is certified that error appears in the above-identified patent and that said Letters Patent are hereby corrected as shown below:

In Claim 3, Line 4, after the word "of" insert the word -- limestone, --.

In Claim 5, line 3, after the word "of" insert the word -- limestone, --.

In Claim 6, Line 12, after the letter "(C)" insert the phrase -- granulating and --, and delete the phrase "and particulating".

Signed and sealed this 22nd day of January 1974.

(SEAL)
Attest:

EDWARD M. FLETCHER, JR.         RENE D. TEGTMEYER
Attesting Officer                Acting Commissioner of Patents